J. L. G. DYKES.
EXPANSIBLE MANDREL.
APPLICATION FILED MAR. 12, 1917.
1,276,041.
Patented Aug. 20, 1918.
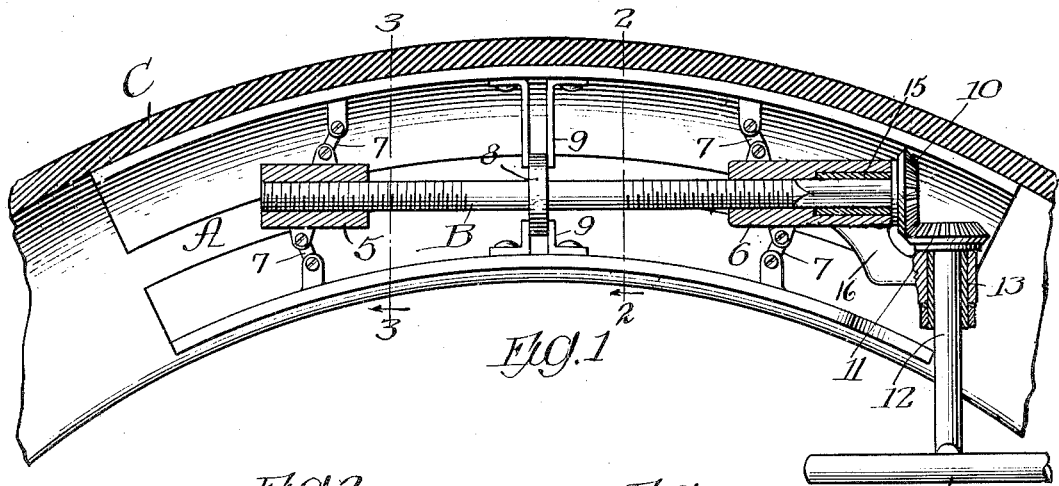
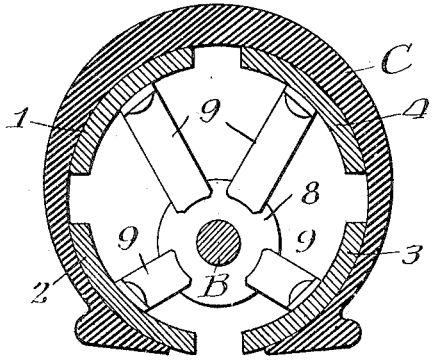
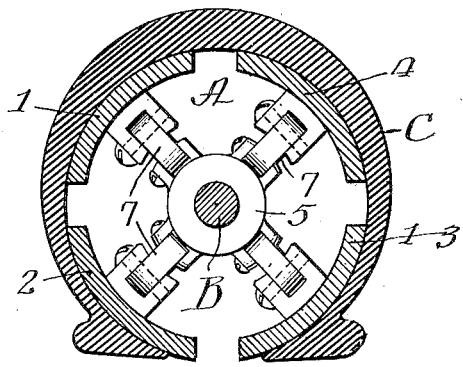
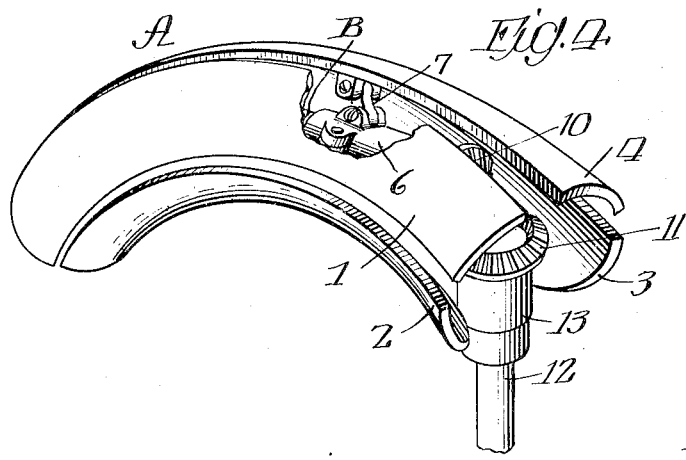
Inventor
John L. G. Dykes
By Arthur L. _____
Atty.

UNITED STATES PATENT OFFICE.

JOHN L. G. DYKES, OF CHICAGO, ILLINOIS.

EXPANSIBLE MANDREL.

1,276,041.　　　　　Specification of Letters Patent.　　Patented Aug. 20, 1918.

Application filed March 12, 1917. Serial No. 154,102.

*To all whom it may concern:*

Be it known that I, JOHN L. G. DYKES, a citizen of the United States of America, and resident of Chicago, Cook county, Illinois, have invented a certain new and useful Improvement in Expansible Mandrels, of which the following is a specification.

My invention relates to expansible mandrels or cores, such, for example, as those employed in the repairing of pneumatic tires, or any purpose requiring the insertion of a mandrel or core within a hollow article to keep the latter expanded during the operation of making repairs, or for any other purpose.

Generally stated, the object of my invention is to provide a novel and improved expansible mandrel or core of the foregoing general character and for any suitable or desired purpose.

A special object is to provide an improved construction and arrangement whereby an expansible mandrel or core of this kind is adapted to be inserted in the pneumatic tire, and then expanded therein, to hold the tire in condition to permit the repairing thereof, and which can then be easily contracted and removed from the pneumatic tire, after the operation of repairing the tire is completed, thereby obviating the use of the inflatable bags or similar devices heretofore employed for this purpose.

It is also an object to provide certain details and features of construction and combinations tending to increase the general efficiency and desirability of an expansible mandrel or core of this particular character.

To these and other useful ends, my invention consists in matters hereinafter set forth and claimed.

In the accompanying drawings:—

Figure 1 is a longitudinal section of an expansible mandrel embodying the principles of my invention, showing the same inserted in place and expanded within the pneumatic tire.

Fig. 2 is an enlarged cross-section on line 2—2 in Fig. 1.

Fig. 3 is an enlarged cross-section on line 3—3 in Fig. 1.

Fig. 4 is a perspective of said mandrel.

As thus illustrated, my invention comprises a mandrel the body-portion of which is practically a segment of a hollow ring, so that in side elevation said body is arcuate in form. In order, however, that it may be expanded, said body A is composed of a plurality of sections 1, 2, 3, and 4, formed by dividing the body along longitudinal lines, each section being practically a quarter of the circumference of the body in cross-section. A screw-threaded rod B extends longitudinally within said mandrel, being provided with right and left threads one of which engages the threaded sleeve 5 and the other the threaded sleeve 6, whereby rotation of this rod within said sleeves will cause the latter to move toward or away from each other. These sleeves are connected by links 7 with the sections 1, 2, 3 and 4, whereby toggle-joints are formed which will cause the sections to move toward and away from each other when said threaded rod is rotated. The middle portion of said rod is provided with a fixed disk 8, and the sections 1, 2, 3 and 4 are provided with inwardly extending guides 9 which engage the opposite sides of said disk, thereby holding the rod B against endwise displacement in the mandrel. One end of this rod is provided with a bevel-gear 10 which engages the bevel-pinion 11, the latter being fixed to the end of the shaft 12, which latter has a bearing 13 disposed at right-angles to the rod B, and which bearing is supported by the sleeve 6, whereby a rotation of the shaft 12 will operate said gearing and cause rotation of the threaded rod. For this purpose, the shaft 12 is provided with a handle 14, or with any other suitable means for causing the rotation thereof. Obviously, the rod B must, of course, have a sliding connection with said bevel 10, and for this purpose the end portion of the rod can be squared to engage the sleeve 15, which latter is rigid with the bevel 10, so that the latter will rotate the rod but allow endwise movement thereof as the screw moves in the threaded sleeve 6, said sleeve 6 containing the sleeve 15 which is cylindric outside and square inside. The bracket 16 supports the bearing 13 on the sleeve 6, so that the shaft 12 moves slowly sidewise with the endwise movement of the sleeve 6 when the mechanism is operated. The bevel 11 holds the bevel 10 against outward displacement from the squared end of the screw-rod.

When the sleeves 5 and 6 are caused to move toward each other, the mandrel is contracted, causing the sections 1, 2, 3 and 4 to come together, and in this condition the mandrel can be inserted in the pneumatic tire C, in a manner that will be readily understood. After such insertion of the mandrel within the tire, it being observed that the curvature of the mandrel is practically the same as that of the tire, the handle 14 can then be manipulated to cause the sleeves 5 and 6 to move away from each other, so that the toggle-joints formed by the links 7 will cause the sections 1, 2 and 3 of the mandrel to move apart, and thus in effect expand the mandrel. As shown, the sleeves 5 and 6 are at the limit of their movement away from each other, so that the toggles are a little past the center in this direction, but by changing the two sleeves toward each other the mandrel will finally be contracted. In this way, a temporary filler or core is provided for the interior of the tire, so that the latter can be repaired in the usual and well-known manner. After the repair-operation is complete, the handle 14 can then be manipulated to contract the mandrel, by causing the sleeves 5 and 6 to move away from each other, and when this has been done the mandrel can be removed. It will be understood, however, that in many cases the adjustment is merely to expand or contract the mandrel to make it fit a certain size of tire, and that when so adjusted it can be both inserted and removed without further adjustment, depending somewhat upon the character of the tire. In other words, some tires are of such character that the mandrel can be removed after the repair-operation, without contracting the mandrel, simply by spreading the tire apart.

It will be seen, therefore, that a mandrel or core is provided which is expansible to either facilitate the insertion or removal of a mandrel in a tire, or to make the mandrel fit any particular size of tire, and which can be used in making repairs, thus obviating the necessity of using inflatable bags or other similar devices heretofore employed for this purpose. Furthermore, an expansible mandrel of this kind is non-yielding in character, while in use in a tire, and affords better opportunity for exerting some pressure on the outside of the tire, during the repair-operation, than is ordinarily the case with an inflatable bag or tube. In fact, therefore, the mandrel contemplates the use of a perfectly solid and non-yielding temporary filler for the tire, as distinguished from a more or less soft or yielding filler.

It will be understood, of course, that the invention is not limited to any particular use, and that while a mandrel of this kind will be found to be specially useful in connection with repair work on pneumatic tires, it is true, of course, that the invention can be used in connection with other hollow articles and for any suitable or desired purpose, or wherever an internal support is desired for a hollow structure during the performance of some operation thereon.

Thus, it will be seen that the mandrel is curved, while the operating screw B is straight, whereby the middle portion of this screw is nearer the bottom or inside curve of the mandrel than the outer side or periphery thereof. This, it will be seen, brings the sleeves 5 and 6 into positions which are about at the center of the mandrel, when the latter is viewed in cross-section (see Fig. 3), but whereby the central portion of the screw is eccentric to the mandrel (see Fig. 2), and so that the mechanism is capable of uniformly expanding the mandrel from a single point outside of the article in which it is used. When the mechanism is operated, the shaft 12 moves with the sleeve 6, in the slot at the bottom of the mandrel, which slot can be widened at its end to provide clearance for said shaft, and for the lower end of the bearing 13, in the manner shown. Furthermore, it will be seen that the links 7 which are at the outer or tread side of the mandrel are nearer the inner ends of the sleeves 5 and 6 than are the links which are shown below the rod B, which latter links connect the sleeves with the inner or base side of the mandrel. In this way, the links shown above in Fig. 1 are not opposite the links shown below, whereby the links are all of uniform length and thus adapted to produce a toggle action which will uniformly expand the mandrel when the operating screw is rotated.

What I claim as my invention is:—

1. An expansible mandrel to be used as a temporary filler for a hollow article, comprising a plurality of sections of a shape adapted for the interior of the hollow article, expanding-mechanism in said mandrel, so that the mandrel may be uniformly expanded for use, and devices to operate said entire mechanism from a single point outside of said article, said sections being shaped to conform to the interior of said hollow article, and said mechanism comprising a threaded rod extending longitudinally of the mandrel and provided with threaded sleeves having toggle-joint connections with the sections of the mandrel, said devices for operating said mechanism including bevel-gearing at one end of said threaded rod and a shaft disposed at an angle to said rod to operate said gearing, a bearing for said shaft, supported on one of said sleeves, and a handle for the outer end of said shaft.

2. An expansible mandrel to be used as a temporary filler for a hollow article, comprising a plurality of sections of a shape adapted for the interior of the hollow article, expanding-mechanism in said mandrel, so that the mandrel may be uniformly expanded for use, and devices to operate said entire mechanism from a single point outside of said article, said mechanism comprising a threaded rod having toggle-joint connections with the sections of the mandrel, inwardly projecting guides on the inner surfaces of the sections, and means on said rod to engage said guides and thereby prevent endwise displacement of the rod, said devices being supported to move with one of said sleeves when said mechanism is operated.

3. In a mandrel, a plurality of separable mandrel sections curved to fit the interior of a pneumatic tire, so that the mandrel as a whole is curved in side elevation and practically cylindric when viewed in cross-section, a rod provided with right and left screw-threads, threaded sleeves on said rod, toggle-links connecting said sleeves with the mandrel sections, whereby the middle portion of the rod is eccentric to the cross-sectional circumference of the mandrel, and so that the threaded end-portions of the rod are substantially concentric to said circumference, and mechanism carried on the end of one of said sleeves to operate said rod to move the sections apart with spaces between them, and toward each other to reduce said spaces, thereby to expand and contract the mandrel.

4. In a mandrel, a plurality of mandrel sections curved to fit the interior of a pneumatic tire, so that the mandrel as a whole is curved in side elevation and practically cylindric when viewed in cross-section, a rod provided with right and left screw-threads, threaded sleeves on said rod, toggle-links connecting said sleeves with the mandrel sections, whereby the middle portion of the rod is eccentric to the cross-section circumference of the mandrel, and so that the threaded end-portions of the rod are substantially concentric to said circumference, and mechanism to operate said rod to expand and contract the mandrel, said mechanism being supported to move with the endwise movement of one of said sleeves on said rod.

5. The structure specified in claim 3, and means engaging the eccentrically-arranged middle portion of said rod to hold said rod against endwise movement relative to the mandrel.

6. In a mandrel, a plurality of mandrel sections curved to fit the interior of a pneumatic tire, so that the mandrel as a whole is curved in side elevation and practically cylindric when viewed in cross-section, a rod provided with right and left screw-threads, threaded sleeves on said rod, toggle-links connecting said sleeves with the mandrel sections, whereby the middle portion of the rod is eccentric to the cross-section circumference of the mandrel, and so that the threaded end-portions of the rod are substantially concentric to said circumference, and mechanism to operate said rod to expand and contract the mandrel, the toggle-links at the outer or tread side of the mandrel being disposed nearer the inner ends of said sleeves than are the toggle-links for the inner or opposite side of the mandrel, so that said links will be of uniform length to uniformly expand the mandrel.

Signed by me at Chicago, Illinois, this 21st day of February, 1917.

JOHN L. G. DYKES.